2,848,452

NOVEL QUATERNARY AMMONIUM SALTS AND METHOD OF PREPARING SAME

Walter H. Schuller, Delray Beach, Fla., assignor to American Cyanamid Company, New York, N. Y., a corporation of Maine No Drawing. Application May 22, 1957
Serial No. 660,745

8 Claims. (Cl. 260—249.9)

This invention relates to novel quaternary ammonium salts and to their method of preparation. More specifically, it relates to a N-(4,6-diamino-s-triazinylmethyl)-N-(2-hydroxyethyl)-N,N-dimethylammonium salt represented by the general formula:

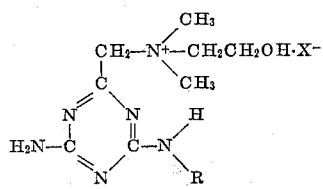

in which R is either a hydrogen or phenyl radical and X is a salt-forming radical such as fluoride, chloride, bromide, iodide, monohydrogen sulfate, dihydrogen phosphate, nitrate or citrate.

The new class of compounds may be characterized as colorless solids which are soluble in polar solvents such as ethanol or propanol. These compounds are particularly useful as antistatic agents in the treatment of synthetic fabrics, as for example, polyamides as nylon, polyesters as Acrilan and the acrylics such as Creslan.

In accordance with the present invention, the class of compounds above defined may be conveniently prepared by reacting substantially equimolar proportions of a haloacetoguanamine and dimethyl-2-hydroxyethylamine in an inert aqueous polar solvent at temperatures above about 50° C.

Among the haloacetoguanamines which can be employed as reactants are for example: chloroacetoguanamine, bromoacetoguanamine, iodoacetoguanamine, N-phenyl-α-chloroacetoguanamine, N-phenyl-α-bromoacetoguanamine or N-phenyl-α-iodoacetoguanamine. The latter guanamines may be readily prepared by reacting a biguanide, such as N-phenyl biguanide, with an ethyl haloacetate. If desired, halide salts may be conveniently converted to other inorganic salts when employing ion exchange resins or by neutralization to the free base, followed by reaction with the appropriate anion, such as nitrate, monohydrogen sulfate, dihydrogen phosphate, or citrate.

It is an advantage of the present invention that the above described class of compounds may be prepared at atmospheric pressure and at temperatures above about 50° C. but below about 100° C. In general, a good operating temperature range has been found to be from about 70° C. to about 90° C. It is also desirable but not necessary to carry out the process in an inert polar solvent. For example, an alcohol such as methanol, ethanol or isopropanol can be used as the polar solvent.

The invention will be illustrated in conjunction with the following examples that are to be taken as illustrative only and not by way of limitation. All parts are by weight unless otherwise stated.

EXAMPLE A

Preparation of N-phenyl-α-chloroacetoguanamine intermediate 354 parts of N-phenylbiguanide (2.0 moles) is dissolved in 500 milliliters of methanol to which 368 parts of ethylchloroacetate (3.0 moles) is added dropwise over a one-half period with stirring. The contents are heated for an additional two hours at 50° C.–69° C. Resultant mixture whose pH is 6.5 is stripped in vacuum and 200 milliliters of water is added to the concentrated resultant slush. The latter is filtered, washed with water and dried in vacuum. The resultant guanamine is insoluble in water, very soluble in methanol and is recovered in 61% yield.

In a similar manner, biguanide per se can be substituted for phenylbiguanide to prepare the corresponding haloacetoguanamine.

EXAMPLE 1

Preparation of N-(4-amino-6-anilino-s-triazinylmethyl-N-(2-hydroxy)-N,N-dimethylammonium chloride To 47 parts of N-phenyl-α-chloroacetoguanamine (0.2 mole) is added 35 parts of a 56% aqueous solution of dimethyl-2-hydroxyethylamine in 40 parts of water and 32 parts of isopropanol. The mixture is heated for 30 minutes at 75° C.–86° C. at which time all the solids are completely dissolved. The solution is heated for an additional hour at an average temperature of 86° C. to insure completeness of the reaction. The solvents are next stripped off under a reduced pressure of about 10 mm. and the resultant product, obtained as a syrup, is readily solidified. The quaternary ammonium chloride product is recrystallized from a mixture of 80 parts of water to give the quaternary salt as large, colorless crystals in yields of 73% based on theoretical and having a decomposition point above 230° C.

In a similar manner, biguanide per se can be substituted for N-phenylbiguanide in the above example to obtain the corresponding N-(4,6-diamino)guanamine derivative. In addition, the chloroacetoguanamine reactant can also be replaced by a bromo or iodoacetoguanamine intermediate, which corresponding bromo or iodo derivative appears in the following table.

TABLE I

| Product | Decomposition Point (° C.) | Percent [1] Halide (Theory) | Percent [1] Halide (Found) |
|---|---|---|---|
| N-(4-amino-6-anilino-s-triazinylmethyl)-N-(2-hydroxyethyl)-N,N-dimethylammonium bromide | >230 | 21.7 | 21.5 |
| N-(4-amino-6-anilino-s-triazinylmethyl)-N-(2-hydroxyethyl)-N,N-dimethylammonium iodide | >230 | 30.6 | 30.3 |
| N-(4,6-diamino-s-triazinylmethyl)-N-(2-hydroxyethyl)-N,N-dimethylammonium chloride | >230 | 14.3 | 14.4 |
| N-(4,6-diamino-s-triazinylmethyl)-N-(2-hydroxyethyl)-N,N-dimethylammonium bromide | >230 | 27.3 | 27.0 |
| N-(4,6-diamino-s-triazinylmethyl)-N-(2-hydroxyethyl)-N,N-dimethylammonium iodide | >230 | 37.4 | 37.6 |

[1] Bromide and chloride are determined by titration with silver nitrate; iodide is determined by titration with thiosulfate.

To demonstrate the utility of the above class of compounds as antistatic agents, the following illustrative example is provided.

EXAMPLE 2

5 parts of N-(4-amino-6-anilino-s-triazinylmethyl)-N-(2-hydroxyethyl)-N,N-dimethylammonium chloride as prepared in the preceding example is dissolved in 100 parts of isopropanol. A 9"x9" sheet of nylon is next immersed in the solution, passed through squeeze rollers and then air dried. The dried sheet is folded over twice in the same direction so as to obtain a sheet measuring 2¼"x9". A charge is induced on the sheet by stroking the same with a glass rod for 15 minutes. The sheet is now exposed to carbon particles that have been previously placed on a table by holding the sheet above the particles. In this test procedure, it is considered that the closer the sheet can be placed near the particles without attraction of particles, the more effective is the antistatic treating agent. In the present example, even at substantially zero height, there is no attraction of carbon particles to the nylon sheet, indicating clearly that the cloth is antistatic due to presence of the antistatic agent.

EXAMPLE 3

Repeating the foregoing example in detail except that the antistatic agent is omitted, the cloth is shown to be static by stroking it for 15 minutes. Carbon particles are attracted to it up to two inches of separation.

I claim:

1. A new composition of matter: a N-(2,4-diamino-s - triazinylmethyl) - N - (2 - hydroxyethyl) - N,N - dimethylammonium salt characterized by the general formula:

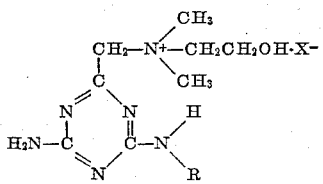

in which R is a radical selected from the group consisting of hydrogen and phenyl and X is a salt-forming radical.

2. As a new composition of matter: N-(4,6-diamino-s - triazinylmethyl) - N - (2 - hydroxyethyl) - N,N - dimethylammonium chloride.

3. As a new composition of matter: N-(4,6-diamino-s-triazinylmethyl) - N - (2 - hydroxyethyl) - N,N - dimethylammonium bromide.

4. As a new composition of matter: N-(4,6-diamino-s-triazinylmethyl) - N - (2 - hydroxyethyl) - N,N-dimethylammonium iodide.

5. As a new composition of matter: N - (4 - amino-6-anilino - s - triazinylmethyl) - N - (2 - hydroxyethyl)-N,N-dimethylammonium chloride.

6. As a new composition of matter: N - (4 - amino - 6-anilino - s - triazinylmethyl) - N - (2 - hydroxyethyl)-N,N-dimethylammonium bromide.

7. A process for the preparation of quaternary ammonium salts characterized by the formula:

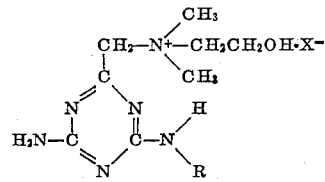

in which R is a radical selected from the group consisting of hydrogen and phenyl and X is a salt-forming radical which comprises the steps of: reacting an acetoguanamine of the structure:

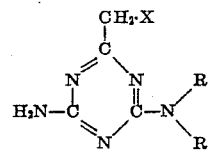

in which "R" and "X" are defined above with about equimolar proportions of dimethyl-2-hydroxyethylamine in an aqueous polar lower alkanol solvent at a temperature above about 50° C.; and thereafter recovering a quaternary ammonium salt defined above.

8. A process according to claim 7 in which the polar solvent is isopropanol.

References Cited in the file of this patent

UNITED STATES PATENTS 2,719,156    De Benneville _____ Sept. 27, 1955

UNITED STATES PATENT OFFICE
CERTIFICATE OF CORRECTION

Patent No. 2,848,452                                                                    August 19, 1958

Walter H. Schuller

It is hereby certified that error appears in the printed specification of the above numbered patent requiring correction and that the said Letters Patent should read as corrected below.

Column 2, line 8, after "one-half" insert -- hour --.

Signed and sealed this 13th day of January 1959.

(SEAL)
Attest:

KARL H. AXLINE                                                  ROBERT C. WATSON
Attesting Officer                                             Commissioner of Patents